United States Patent
Cherng et al.

(10) Patent No.: US 9,520,614 B2
(45) Date of Patent: Dec. 13, 2016

(54) PACKING DEVICE FOR ELECTRODE SHEETS AND PACKING METHOD THEREOF

(71) Applicant: AMITA TECHNOLOGIES INC LTD., Taoyuan County (TW)

(72) Inventors: Jing-Yih Cherng, Taoyuan County (TW); Te-Chuan Lai, Taoyuan County (TW); Yen-Liang Tsai, Taoyuan County (TW)

(73) Assignee: AMITA TECHNOLOGIES INC LTD., Taoyuan County (TW)

( * ) Notice: Subject to any disclaimer, the term of this patent is extended or adjusted under 35 U.S.C. 154(b) by 78 days.

(21) Appl. No.: 14/692,001

(22) Filed: Apr. 21, 2015

(65) Prior Publication Data

US 2015/0303508 A1 Oct. 22, 2015

(30) Foreign Application Priority Data

Apr. 21, 2014 (TW) .............................. 103114361 A

(51) Int. Cl.
*H01M 10/04* (2006.01)
*H01M 10/0585* (2010.01)

(52) U.S. Cl.
CPC ....... *H01M 10/0404* (2013.01); *H01M 10/049* (2013.01); *H01M 10/0585* (2013.01); *H01M 10/0468* (2013.01)

(58) Field of Classification Search
CPC ............ H01M 10/049; H01M 10/0468; H01M 10/0404; H01M 10/0585; H01M 10/04; B65B 7/00; B65B 5/10; B65B 5/00; B65B 5/068; B65B 5/026; B65B 5/04
See application file for complete search history.

(56) References Cited

U.S. PATENT DOCUMENTS

| 2003/0079444 A1* | 5/2003 | Behnke | B65B 7/164 53/467 |
| 2014/0058598 A1* | 2/2014 | Matsui | H01M 4/131 701/22 |

* cited by examiner

*Primary Examiner* — Emily Le
*Assistant Examiner* — Monique Wills
(74) *Attorney, Agent, or Firm* — Chun-Ming Shih; HDLS IPR Services

(57) ABSTRACT

A packing device for electrode sheets is provided in the present disclosure. The packing device is used for pasting tapes on a stack structure consisted of the electrode sheets to packing the stack structure. The packing device is included of a tape fetching mechanism, a couple of claws, a carrying mechanism and a positioning mechanism. The tape fetching mechanism is used for moving a tape and putting on the claws. The claws are arranged at interval and a gap is thereby formed between the claws. Each claw is included of a chamfer surface, and the chamfer surfaces are arranged at opposite sides of the gap. The carrying mechanism is used for loading the stack structure. The positioning mechanism is used to drive the claws and the carrying mechanism move related to each other.

11 Claims, 7 Drawing Sheets

PACKING DEVICE FOR ELECTRODE SHEETS AND PACKING METHOD THEREOF

BACKGROUND

The present disclosure is related to process of lithium battery, particularly a packing device for electrode sheets and a packing method thereof.

DESCRIPTION OF RELATED ART

A conventional lithium battery is included of a stack structure consisted of electrode sheets. The stack structure is put into a foil bag, and the foil bag is filled with electrolyte solution and sealed. Each electrode sheet is chemically reacted with the electrolyte solution and electric power is generated via the chemical reaction.

In general, the electrode sheets are manually pasted with tapes and thereby packed as the stack structure. Therefore, the process is unstable and slow.

In views of this, in order to solve the above disadvantage, the present inventor studied related technology and provided a reasonable and effective solution in the present disclosure.

SUMMARY

A purpose of the present disclosure is providing a packing device for an automation pasting process to a stack of electrode sheets.

In order to accomplish the above purpose, a packing device is provided in the present disclosure. The packing device is used to past tapes on a stack structure consisted of the electrode sheets. The packing device is included of a couple of claws, a tape fetching mechanism, a carrying mechanism and a positioning mechanism.

The couple of claws are arranged at interval, a gap being formed between the claws, each claw is included of a chamfer surface, and the chamfer surfaces are arranged at opposite sides of the gap. The tape fetching mechanism is used to move a tape and putting the tape on the claws. The carrying mechanism is used to load the stack structure. The positioning mechanism is used to drive the claws and the carrying mechanism move related to each other. Accordingly, the stack structure is thereby packed.

The packing device according is preferably further included of a rotator. The rotator is included of a rotating shaft and able to rotate about the rotating shaft, and the claws are arranged on the rotator.

The packing device is preferably further included of a feeding roller. A strip is furled on the feeding roller, and a plurality of tapes are arranged on the strip.

The claws are preferably driven by the positioning mechanism.

The carrying mechanism is preferably driven by the positioning mechanism.

Another purpose of the present disclosure is providing a packing method for an automation pasting process to a stack of electrode sheets.

In order to accomplish the above purpose, a packing method for pasting tapes on a stack structure consisted of the electrode sheets is provided in the present disclosure. The packing method is included of following steps: providing a plurality of electrode sheets; stacking the electrode sheets to consist a stack structure having a couple of external surfaces and a lateral surface connected between the external surfaces; providing a couple of claws arranged at interval, a gap is formed between the claws, each claw has a chamfer surface, and the chamfer surfaces are arranged at both sides of the gap; providing a tape having an adhesive surface, both end of the tape are connected to each tip of a couple of claws, and the other surface of the tape is contacted with the claws; aligning the lateral surface with the gap; moving the couple of claws toward the lateral surface and pasting the adhesive surface on the lateral surface; further moving the claws toward the stack structure and guiding the stack structure move into the gap by the chamfer surface; pressing both end of the tape by the claws, and the ends are thereby bent along respective edges of the external surfaces and respective pasted on the external surfaces.

The claws and the stack structure are preferably moved related to each other, and the lateral surface is thereby aligned with the gap.

The claws and the stack structure are preferably rotated, and the lateral surface is thereby aligned with the gap.

A carrying mechanism for loading the stack structure and a positioning mechanism driving the carrying mechanism are preferably provided, and the carrying mechanism is moved related to the claws by the positioning mechanism.

A positioning mechanism driving the claws is preferably provided, and the claws are moved related to the stack structure by the positioning mechanism.

A rotator is preferably provided, the rotator is comprised of a rotating shaft, the claws are arranged on the rotator, and the claws are rotated by the rotator to align the gape The packing method of the present disclosure could be repeated as an automation process by the packing device of the present disclosure. Thereby, the electrode sheets could be packed by automation process to consist the stack structure.

DETAILED DESCRIPTION OF EMBODIMENT

Figure 1:
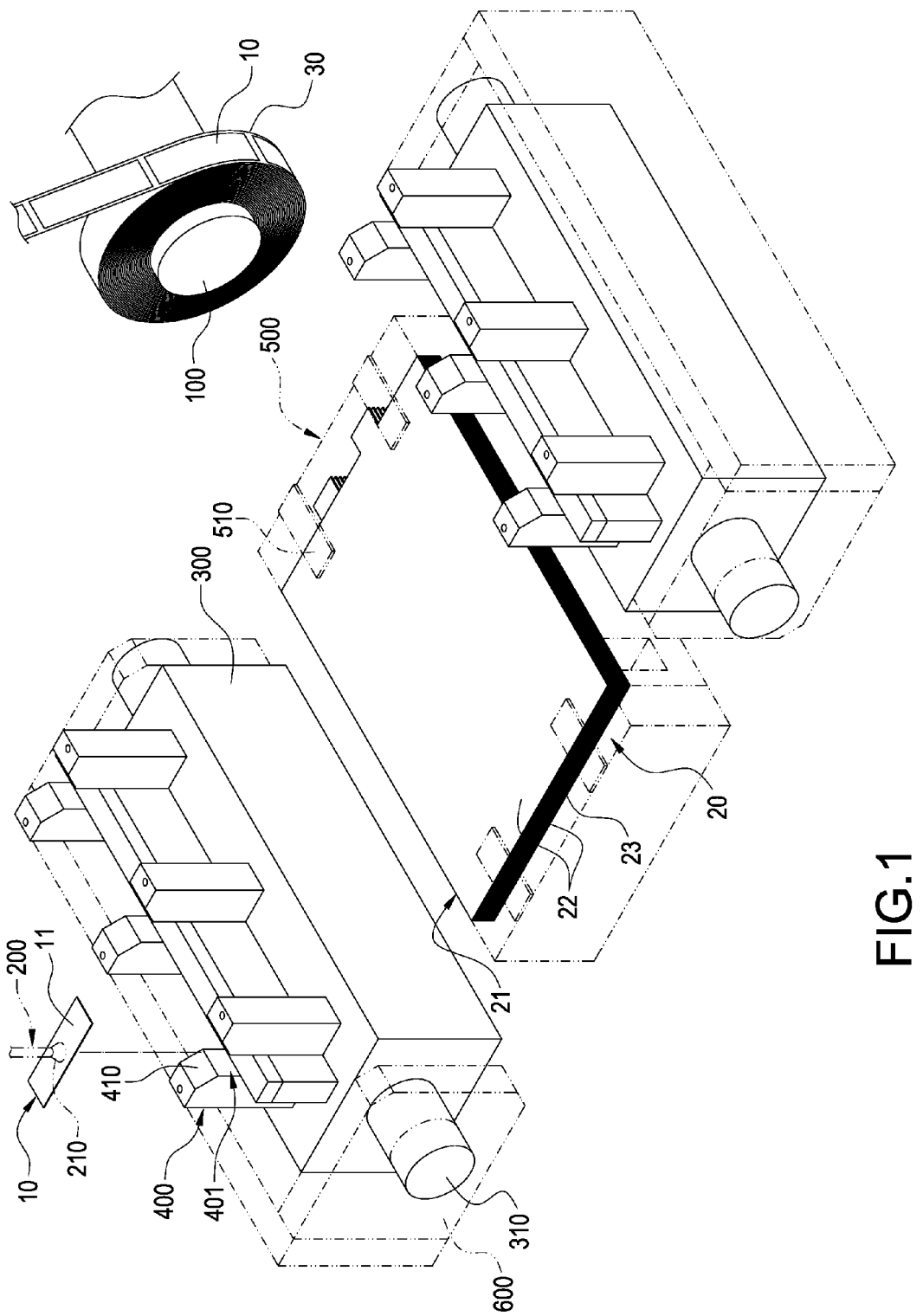
FIG. 1 is a schematic diagram showing the packing device according to the first embodiment of the present disclosure.

Please refer to FIG. 1. A packing device for pasting tapes 10 onto a stack structure 20 consisted of multiple electrode sheets 21 is provided in an embodiment of the present disclosure. The packing device is included of a feeding roller 100, a tape fetching mechanism 200, a couple of rotator 300, multiple couples of claws 400, a carrying mechanism 500 and a positioning mechanism 600.

In the present embodiment, a strip 30 is furled on the feeding roller 100, multiple tapes 10 are arranged on the strip 30, and the tapes 10 are thereby continuously provided.

In the present embodiment, the tape fetching mechanism 200 is preferably included of a suction cup 21, the tapes 10 are sucked by the suction cup 21 and thereby removed from the strip 30, and the tapes 10 moved by the suction cup 21 and thereby put onto a couple of the claws 400 by moving the suction cup 21.

Each rotator 300 is included of a rotation shaft 310, and the rotator 300 is able to be rotated along the rotation shaft 310. In the present embodiment, the rotators 300 are arranged at interval.

In the present embodiment, the packing device is included of six couples of claws 400, quantity of the claws 400 is not thereby limited. Three couples of claws 400 are arranged at interval on each rotator 300, and a tip of each claw 400 is arranged toward the same direction. The claws 400 of each couple are arranged at interval, and a gap 401 is thereby formed between the claws 400. A chamfer surface 410 is formed on the tip of each claw 400. The chamfer surfaces 410 of each couple are arranged at both sides of the gap 401 and opposite to each other.

The carrying mechanism 500 is used to load the stack structure 20. In the present embodiment, the carrying mechanism 500 is preferable included of a clamp 510 for clamping the stack structure 20, and the stack structure 20 could be moved and positioned by the clamp 510. However, the carrying mechanism 500 should not be limited in above description. For example, the carrying mechanism 500 could include a loading plate (the loading plate is not shown in figures), the stack structure 20 is load on the loading plate, and the stack structure 20 is moved and positioned thereby.

The positioning mechanism 600 is used to drive the claws 400 and the carrying mechanism 500 move related to each other. The positioning mechanism 600 could be connected to the rotator 300 and rotate the claws 400 on the rotator 300, and the claws are thereby moved related to the carrying mechanism 500. The positioning mechanism 600 could be connected to carrying mechanism 500 and move the carrying mechanism 500, and the carrying mechanism 500 is thereby moved related to the claws 400.

Figure 7:
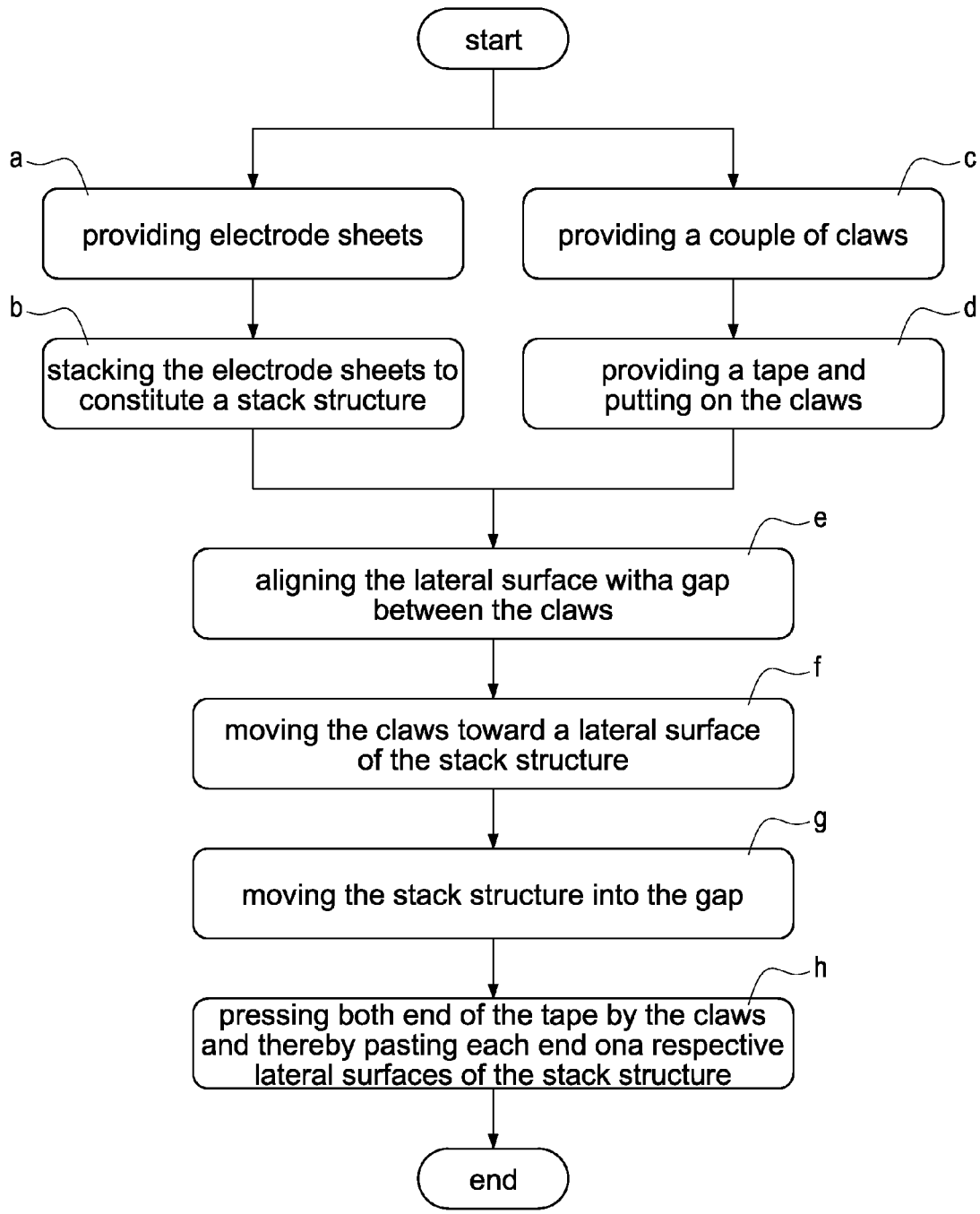
FIG. 7 is a flow chart showing the packing method of according to the second embodiment the present disclosure.

Please refer to FIG. 7. A packing method for pasting tapes 10 onto a stack structure 20 consisted of multiple electrode sheets 21 is provided in an embodiment of the present disclosure, and the packing method is included step described below.

Please refer to FIGS. 1. and 7. Multiple electrode sheets 21, a carrying mechanism 500 and a positioning mechanism 600 are provided in step a.

After step a, a stack structure 20 is consisted by the stacked electrode sheets 21 in step b, and the stack structure 20 is clamped by the carrying mechanism 500. A couple of external surface 22 opposite to each other and a lateral surface 23 connected between the external surfaces 22 are formed on the stack structure 20.

A rotator 300 and at least a couple of claws 400 are provided in step c. In the present embodiment, a rotator 300 and six couples of claws 400 are provided. Each rotator 300 is included of a rotation shaft 310, and the rotator 300 is able to rotate about the rotation shaft 310. Three couples of claws 400 are arranged at interval on each rotator 300. The two claws 400 of each couple are arranged at interval, a gap 401 is thereby formed between the claws 400, each claw is included of a chamfer surface 410, and the two chamfer surfaces 410 of each couple of claws 400 are arranged at both sides of the gap 401 and opposite to each other.

Figure 2:
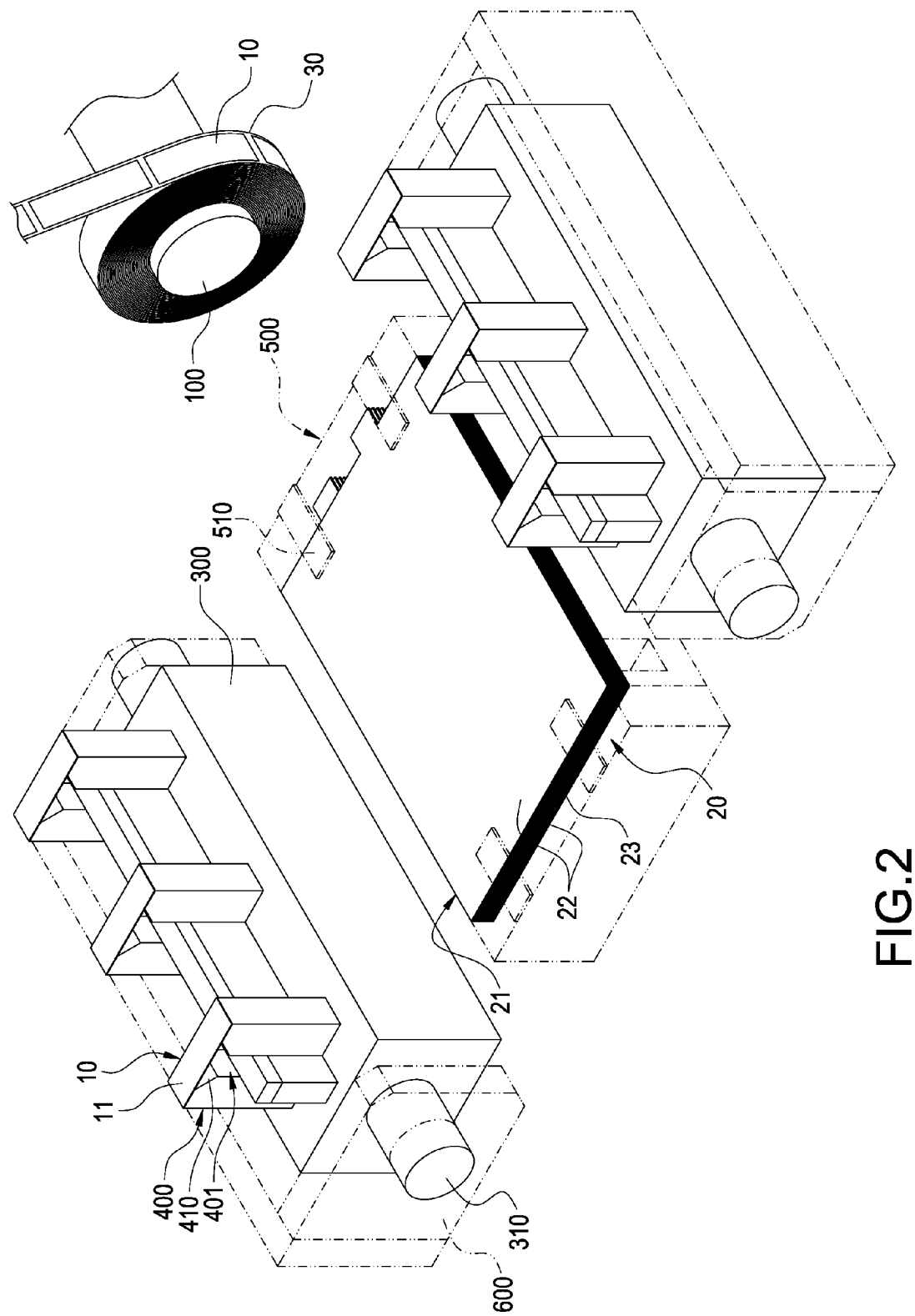
FIG. 2 is a schematic diagram showing the operated status of the packing device according to the first embodiment of the present disclosure.

Please refer to FIG. 1-2. and 7. A tape 10 having an adhesive surface 11 coated adhesives is provided in step d, both end of the tape 10 are connected to each tip of a couple of claws 400, and the other surface of the tape is contacted with the claws 400. In the present embodiment, multiple tapes 10 are provided by a strip 30, the tapes 10 are arranged on the strip 30, and the strip 30 is furled on a feeding roller 100. In the present embodiment, the tape 10 is preferably removed from the strip 30 and moved by a tape fetching mechanism 200, a tape 10 is thereby put on each couple of claws 400, and the both end of the tape 10 are respectively connected to the two claws 400. The tape fetching mechanism 200 is not limited by the above description. For example, the tape fetching mechanism 200 could include a suction cup 21 or a clamp (the clamp is not shown in figures).

Figure 3:
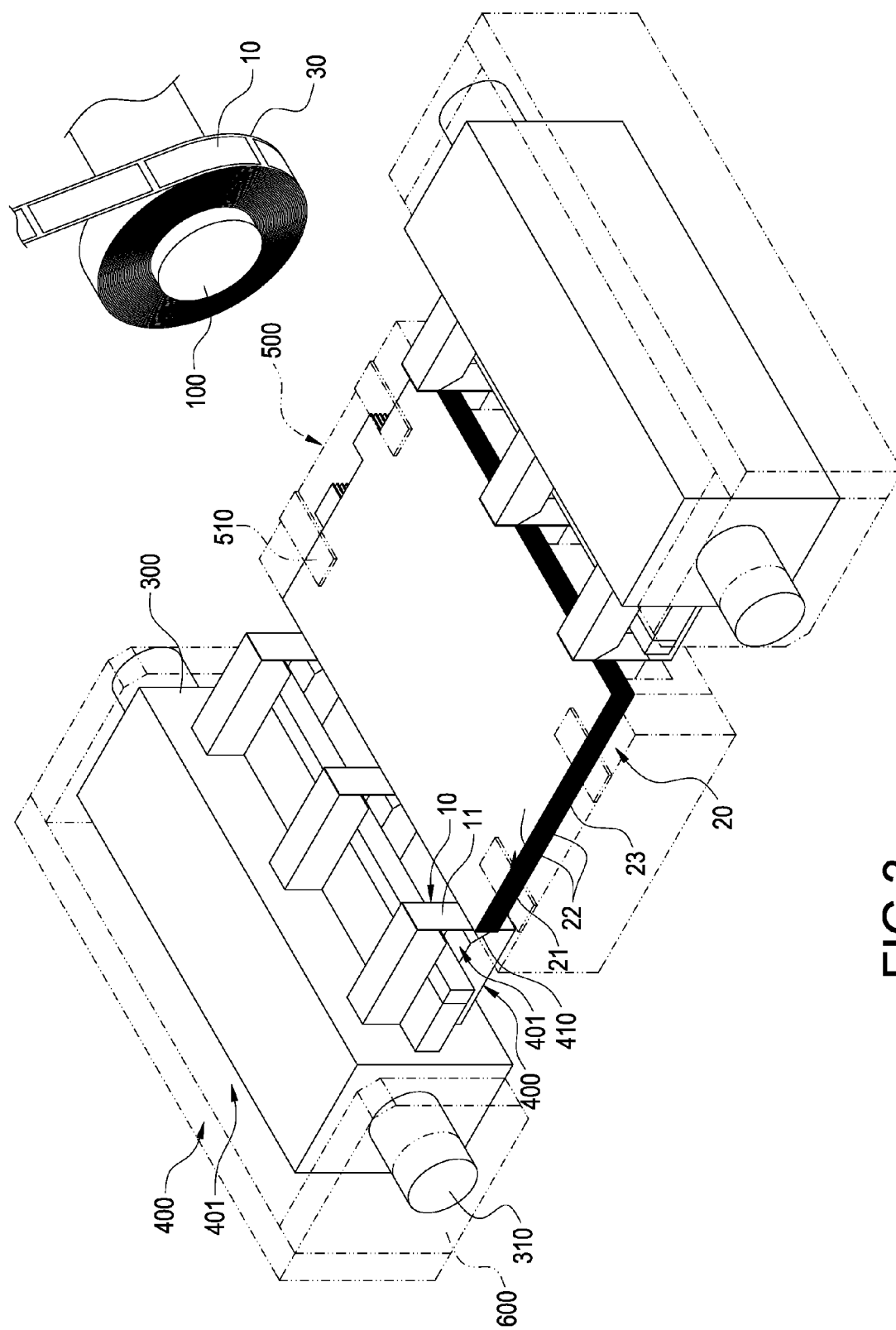
FIG. 3 is another schematic diagram showing the operated status of the packing device according to the first embodiment of the present disclosure.

Please refer to FIGS. 2-3, and 7. Each rotator 300 is rotated in step e, and the claws 400 thereon are thereby rotated. The claws 400 are moved related to the stack structure 20 by the positioning mechanism 600, and the stack structure 20 is positioned between the rotators 300 and the lateral surface 23 is aligned with each gap 401. Accordingly, the claws 400 and the stack structure 20 are moved related to each other by the positioning mechanism 600 and via any one of following means. The carrying mechanism 500 might be connected with the positioning mechanism 600 and moved thereby to move the stack structure 20 related to the claws 400; the rotator 300 might be connected with the positioning mechanism 600 and moved thereby to move the claws 400 related to the stack structure 20.

Figure 4:
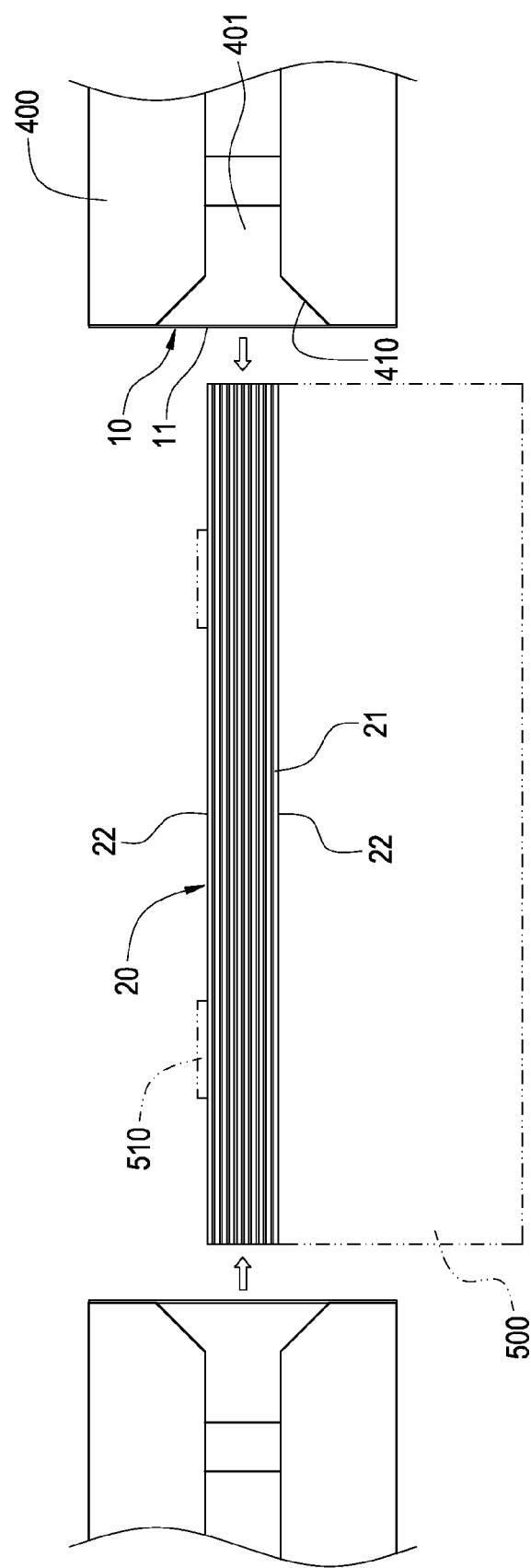
FIG. 4 is still another schematic diagram showing the operated status of the packing device according to the first embodiment of the present disclosure.

Please refer to FIGS. 4. and 7. In step f, the claws 400 are driven by the positioning mechanism 600 move toward the lateral surface 23 of the stack structure 20, and each adhesive surface 11 is thereby pasted on a part of the lateral surface 23

Figure 5:
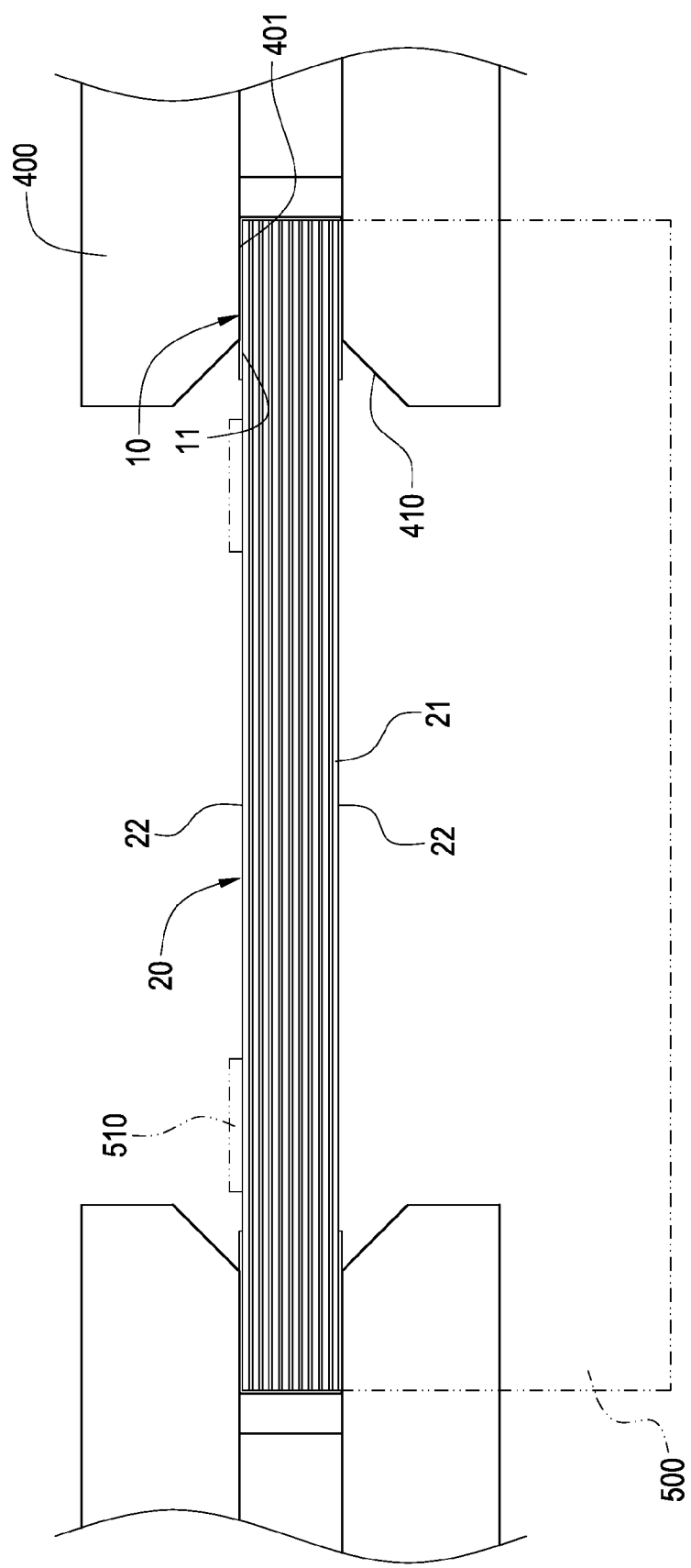
FIG. 5 is still another schematic diagram showing the operated status according to the first embodiment of the packing device of the present disclosure.

Please refer to FIGS. 5. and 7. Each couple claws 400 are further moved toward the stack structure 20 in step g, and the stack structure 20 is guided by the chamfer surface 410 to move into the gap 401.

Figure 6:
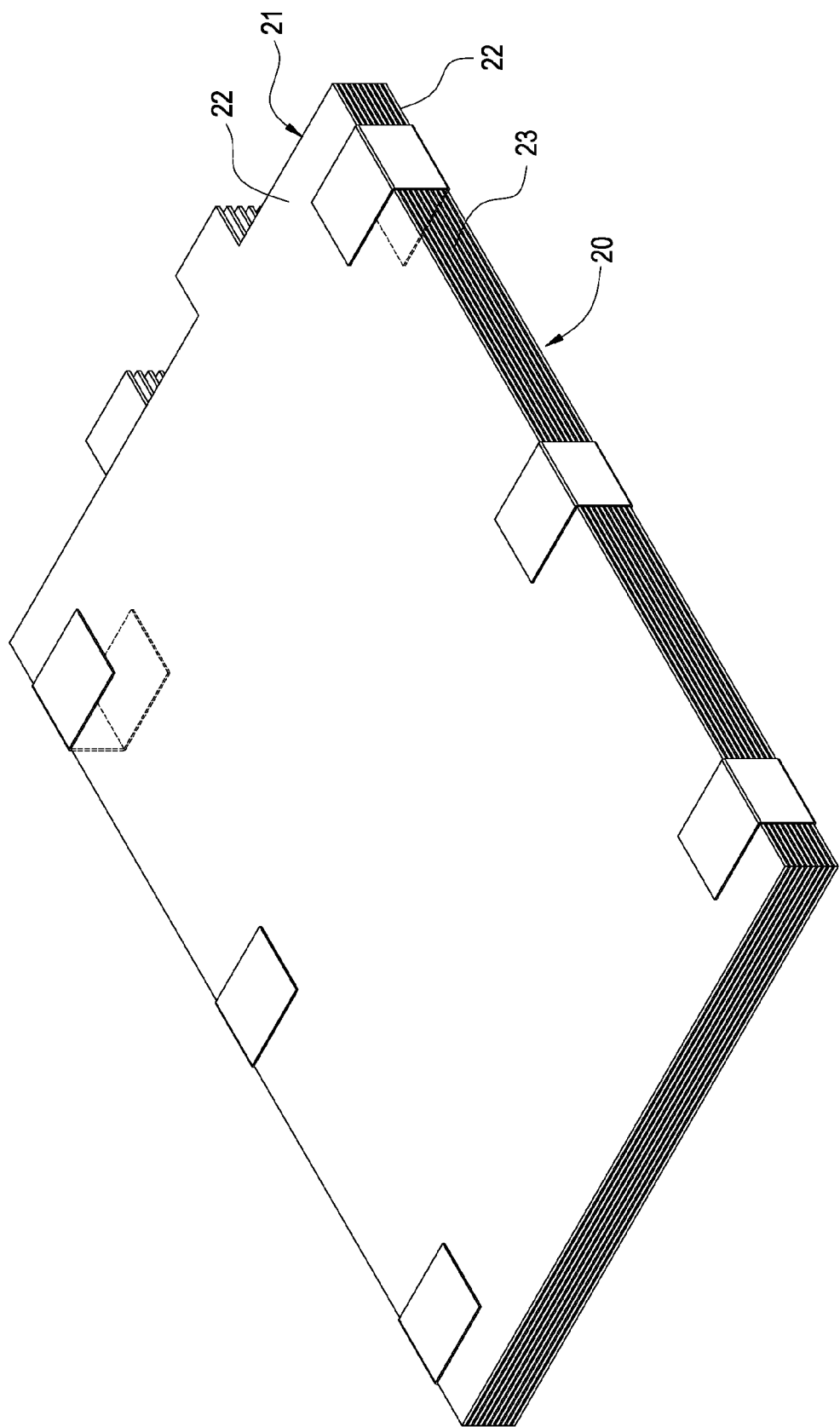
FIG. 6 is a schematic diagram showing a product made by the packing device according to the first embodiment of the present disclosure.

Please refer to FIG. 5-7, both ends of each tape 10 are pressed by corresponding claws 400. Both ends of each tape 10 are bent along respective edges of the external surfaces 22 and pasted on to respective external surfaces 22, and the stack structure 20 is thereby packed (shown in FIG. 6.).

The packing method of the present disclosure could be repeated as an automation process by the packing device of the present disclosure. Thereby, the electrode sheets 21 could be packed by automation process to constitute the stack structure 20

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the present disclosure as defined in the appended claims.

What is claimed is:

1. A packing device for pasting tapes on a stack structure, the stack structure being consisted of a plurality of electrode sheets, the packing device comprising:
    a couple of claws arranged at interval, a gap being formed between the claws, each claw being comprised of a chamfer surface, and the chamfer surfaces being arranged at opposite sides of the gap;
    a tape fetching mechanism for moving a tape and putting the tape on the claws;

a carrying mechanism for loading the stack structure; and
a positioning mechanism for driving the claws and the carrying mechanism move related to each other.

2. The packing device according to claim 1, further comprising a rotator, wherein the rotator is comprised of a rotating shaft and rotatable around the rotating shaft, and the claws are arranged on the rotator.

3. The packing device according to claim 1, further comprising a feeding roller, wherein a strip is furled on the feeding roller and a plurality of tapes are arranged on the strip.

4. The packing device according to claim 1, wherein the claws are driven by the positioning mechanism.

5. The packing device according to claim 1, wherein the carrying mechanism is driven by the positioning mechanism.

6. A packing method for pasting tapes on a stack structure, the stack structure consisted of a plurality electrode sheets, the packing method comprising steps:
   a; providing a plurality of electrode sheets;
   b; stacking the electrode sheets to constitute a stack structure having a couple of external surfaces opposite to each other and a lateral surface connected between the external surfaces;
   c; providing a couple of claws arranged at interval, wherein a gap being formed between the claws, each claw having a chamfer surface, and the chamfer surfaces being arranged at both sides of the gap;
   d; providing a tape having an adhesive surface, wherein both end of the tape are connected to each tip of a couple of claws, and the other surface of the tape is contacted with the claws;
   e; aligning the lateral surface with the gap;
   f; moving the couple of claws toward the lateral surface and pasting the adhesive surface on the lateral surface;
   g; further moving the claws toward the stack structure and guiding the stack structure move into the gap by the chamfer surface; and
   h; pressing both end of the tape by the claws, and the ends are thereby bent along respective edges of the external surfaces and respectively pasted on the external surfaces.

7. The packing method according to claim 6, wherein the claws and the stack structure are moved related to each other, and the lateral surface is thereby aligned with the gap.

8. The packing method according to claim 6, wherein the claws and the stack structure are rotated, and the lateral surface is thereby aligned with the gap.

9. The packing method according to claim 7, wherein a carrying mechanism for loading the stack structure and a positioning mechanism driving the carrying mechanism are provided in the step a, and the carrying mechanism is moved related to the claws by the positioning mechanism in the step e.

10. The packing method according to claim 6, wherein a positioning mechanism driving the claws is provided in the step e, and the claws are moved related to the stack structure by the positioning mechanism.

11. The packing method according to claim 6, wherein a rotator is provided in the step c, the rotator is comprised of a rotating shaft, the claws are arranged on the rotator, and the claws are rotated by the rotator to align the gap in the step e.

* * * * *